US011671170B2

(12) United States Patent
Levy et al.

(10) Patent No.: US 11,671,170 B2
(45) Date of Patent: Jun. 6, 2023

(54) METHOD FOR DETERMINING CONSTRAINTS OF A NON-GEOSTATIONARY SYSTEM WITH RESPECT TO ANOTHER NON-GEOSTATIONARY SYSTEM

(71) Applicant: THALES, Courbevoie (FR)

(72) Inventors: Jean-Christophe Levy, Toulouse (FR); Arnaud Guerin, Toulouse (FR); Alexandre Guerin, Toulouse (FR)

(73) Assignee: THALES, Courbevoie (FR)

( * ) Notice: Subject to any disclaimer, the term of this patent is extended or adjusted under 35 U.S.C. 154(b) by 17 days.

(21) Appl. No.: 17/631,488

(22) PCT Filed: Jul. 29, 2020

(86) PCT No.: PCT/EP2020/071339
§ 371 (c)(1),
(2) Date: Jan. 30, 2022

(87) PCT Pub. No.: WO2021/018932
PCT Pub. Date: Feb. 4, 2021

(65) Prior Publication Data
US 2022/0271831 A1 Aug. 25, 2022

(30) Foreign Application Priority Data

Jul. 31, 2019 (FR) ........................................ 1908699
Apr. 23, 2020 (FR) ........................................ 2004048

(51) Int. Cl.
*H04B 7/185* (2006.01)
*H04B 7/195* (2006.01)
(52) U.S. Cl.
CPC ..... *H04B 7/18517* (2013.01); *H04B 7/18519* (2013.01); *H04B 7/195* (2013.01)

(58) Field of Classification Search
CPC ............ H04B 7/18517; H04B 7/18519; H04B 7/195; H04B 7/18513; H04B 7/18515
See application file for complete search history.

(56) References Cited

U.S. PATENT DOCUMENTS 6,011,951 A      1/2000  King et al.
2001/0045494 A1 11/2001 Higgins

FOREIGN PATENT DOCUMENTS

EP    3 182 615 A1    6/2017
FR    3014270 A1 *   6/2015   ......... H04B 7/18513
(Continued)

*Primary Examiner* — Keith Ferguson
(74) *Attorney, Agent, or Firm* — BakerHostetler

(57) ABSTRACT

A method for determining operational constraints for a first constellation of non-geostationary satellites transmitting towards a terrestrial station with respect to a second constellation of non-geostationary satellites linked with the station, the constraints comprising a maximum transmission power of the satellites of the first constellation, the method comprising: determining triplets of limit values ($\theta$, $\phi$, I/N) of two angles ($\theta$, $\phi$) and of an interference-to-noise ratio (I/N), the angles ($\theta$, $\phi$) defining a position of a satellite of the first constellation relative to the station and to a satellite of the second constellation and the interference-to-noise ratio being the ratio between interferences transmitted by the first constellation on a link between the station and the satellite of the second constellation and the noise (N) of the link, the determination of the triplets being performed so that a distribution of signal-to-noise and interference ratios (R) aggregated over a time interval is greater than a reference distribution; determining at least the maximum transmission power of at least one satellite of the first constellation from the triplets.

9 Claims, 4 Drawing Sheets

(56) References Cited

FOREIGN PATENT DOCUMENTS

WO     2009/051907 A1    4/2009
WO     2017/177343 A1   10/2017

* cited by examiner

METHOD FOR DETERMINING CONSTRAINTS OF A NON-GEOSTATIONARY SYSTEM WITH RESPECT TO ANOTHER NON-GEOSTATIONARY SYSTEM

CROSS-REFERENCE TO RELATED APPLICATIONS

This application is a National Stage of International patent application PCT/EP2020/071339, filed on Jul. 29, 2020, which claims priority to foreign French patent application No. FR 2004048, filed on Apr. 23, 2020, and French patent application No. FR 1908699 filed on Jul. 31, 2019, the disclosures of which are incorporated by reference in their entireties.

FIELD OF THE INVENTION

The invention relates to a method for determining operational constraints to be observed for a first constellation of non-geostationary satellites transmitting towards a terrestrial station at a point on the Earth with respect to a second constellation of non-geostationary satellites linked with the same terrestrial station. This method also makes it possible to determine the operational constraints to be observed for a first terrestrial station linked with a first constellation of non-geostationary satellites transmitting towards a satellite belonging to a second constellation of non-geostationary satellites and linked with a second terrestrial station at a point on the Earth.

BACKGROUND

The international regulations require the different non-geostationary systems to be coordinated in order to avoid interfering with one another. This coordination is generally reflected by the definition and the setting up of acceptable levels of interference and by operational constraints which can lead to a reduction of capacity of certain systems.

The need for coordination is a genuine constraint because it demands the protection of and/or protection from all the types of stations of the other constellations over the service zones of these other constellations, if the zones are known, even to protect or be protected for all the points on the Earth, without knowing the direction in which the terminal that is victim of an interference is aiming.

FIG. 1 represents a diagram of the existing solutions for coordinating non-geostationary systems. A satellite NGSO1 of a first non-geostationary constellation CONS1 is linked with a terrestrial station S1 at a point on the Earth. A topocentric angle θ is defined between the satellite NGSO1, the terrestrial station S1 and a satellite NGSO2 of a second non-geostationary constellation CONS2. The satellite NGSO2 will be able to transmit towards the terrestrial station S1 only if the topocentric angle θ is greater than a predetermined angle, for example equal to 10°.

This condition on the topocentric angle imposes strong constraints on the interfering constellation CONS2, which are greater than the needs of the system suffering the interferences from the constellation CONS2, this system comprising the first constellation CONS1 and the terrestrial station S1. These constraints are therefore fairly strict and inflexible.

Furthermore, that requires a large number of operational constraints to be taken into account by the operational module managing the radio resources.

SUMMARY OF THE INVENTION

The invention aims to remedy the abovementioned drawbacks of the prior art, more particularly it aims to propose a method for determining operational constraints for a first constellation of non-geostationary satellites transmitting towards a terrestrial station linked with a second constellation of non-geostationary satellites. It aims also to propose a method for determining operational constraints for a first terrestrial station transmitting towards a non-geostationary satellite of a constellation of non-geostationary satellites linked with a second terrestrial station. The method according to the invention notably makes it possible to adapt the topocentric angle threshold below which the transmission from the satellites of the first constellation or from the first terrestrial station is prohibited, and thus obtain constraints that fit a precise operational situation.

One object of the invention is therefore a method, implemented by computer, for determining operational constraints to be observed for a first constellation of non-geostationary satellites transmitting towards a terrestrial station at a point on the Earth with respect to a second constellation of non-geostationary satellites linked with the terrestrial station, the operational constraints comprising at least a maximum transmission power of the satellites of the first constellation, the method comprising the steps of:

determining triplets of limit values of two angles and of an interference-to-noise ratio, the two angles defining a position of a satellite of the first constellation relative to an axis formed by the terrestrial station and a satellite of the second constellation and the interference-to-noise ratio being the ratio between the interferences transmitted by the first constellation on a link between the terrestrial station and the satellite of the second constellation and the noise of the link, the determination of the triplets being performed in such a way that a distribution of signal-to-noise and interference ratios aggregated over a time interval is greater than a reference distribution, the signal-to-noise and interference ratios being the ratios between a useful signal of the link and the noise and the interferences;

determining at least the maximum transmission power of at least one satellite of the first constellation from the triplets of values.

According to embodiments:

the triplets of limit values are determined by the following steps:

1) selecting, for each instant of a time interval, satellites of the first constellation and a satellite of the second constellation and determining, for each instant of the time interval, a triplet of angle values defining a position of the selected satellites of the first constellation with respect to an axis formed by the terrestrial station and the selected satellite of the second constellation and of signal-to-noise and interference ratio, the signal-to-noise and interference ratio being the signal-to-noise and interference ratio of the selected satellites of the first constellation with respect to the link between the terrestrial station and the selected satellite of the second constellation;

2) determining the instants of the time interval and adjusting the signal-to-noise and interference ratio value of the triplet of these instants in such a way that a distribution of the signal-to-noise and interference ratios aggregated over the time interval is greater than a reference distribution;

3) determining triplets of values at the determined instants and a surface equation parameterized by the triplets, the triplets of values (θ, φ, I/N) being the angles (θ, φ) defining the position of a selected satellite of the first constellation and I/N being an interference-to-noise ratio on the link determined by the adjusted signal-to-noise and interference ratios, the points of this surface equation representing the triplets of limit values (θ, φ, I/N).

The selection of the satellites in the step 1) is done so as to minimize a signal-to-noise and interference ratio on a link between the terrestrial station and a satellite of the second constellation.

The method comprises the following steps performed after the step 3):
4) for each instant of the time interval and for a satellite of the second constellation linked with the terrestrial station, selecting satellites of the first constellation that have angle values and an interference-to-noise ratio on the link between the terrestrial station and the satellite of the second constellation, such that, for these angle values, the interference-to-noise ratio is less than or equal to the interference-to-noise ratio obtained by the surface equation for these same angle values;
5) determining the instants of the time interval and adjusting the signal-to-noise and interference ratio value of the selected satellites of the first constellation for these instants so as to minimize the difference between a distribution of the signal-to-noise and interference ratios aggregated over the time interval of the selected satellites and a reference distribution, the distribution of the aggregate signal-to-noise and interference ratios being greater than the reference distribution;
6) determining a second surface equation parameterized by the angle and interference-to-noise ratio values adjusted from the adjusted signal-to-noise and interference ratios of the selected satellites at the instants determined in the step 5), the points of this second surface equation representing the triplets of the limit values (θ, φ, I/N).

The method comprises the following steps performed after the step 3):
3') determining the angle values defining the position of a satellite of the first constellation transmitting towards the terrestrial station linked with a satellite of the second constellation and the interference-to-noise ratio of the satellite of the first constellation on the link between the terrestrial station and the satellite of the second constellation;
3") comparing the interference-to-noise ratio to the interference-to-noise ratio determined by the surface equation for the angle values determined in 3'), so that:
  if the interference-to-noise ratio is less than or equal to that determined by the surface equation, retaining or increasing the transmission power of the satellite of the first constellation so that its interference-to-noise ratio remains lower than that of the surface equation;
  if the interference-to-noise ratio is greater than that obtained with the surface equation, reducing the transmission power of the satellite of the first constellation so that its interference-to-noise ratio is greater than or equal to that of the surface equation.

The method is implemented for a plurality of assumed positions of terrestrial stations.

The satellites of the first constellation and the satellite of the second constellation selected in the step 1) are those that minimize the value of an angle defining the position of the satellites of the first constellation relative to the axis formed between the terrestrial station and a satellite of the second constellation.

Another object of the invention is a method, implemented by computer, for determining operational constraints to be observed for a first terrestrial station at a point on the Earth, transmitting towards a non-geostationary satellite of a constellation of non-geostationary satellites linked with a second terrestrial station with respect to the link between the satellite and the second terrestrial station, the operational constraints comprising at least a maximum transmission power of the first terrestrial station, the method comprising the steps of:

determining triplets of limit values (θ, φ, I/N) of two angles and of an interference-to-noise ratio, the two angles defining a position of the first terrestrial station relative to an axis formed by the second terrestrial station and the non-geostationary satellite and the interference-to-noise ratio being the ratio between interferences transmitted by the first terrestrial station on the link between the second terrestrial station and the non-geostationary satellite and the noise of the link, the determination of the triplets being performed in such a way that a distribution of signal-to-noise and interference ratios aggregated over a time interval is greater than a reference distribution, the signal-to-noise and interference ratios being the ratios between a useful signal of the link and the noise and the interferences;

determining at least the maximum transmission power of the first terrestrial station from the triplets of values.

According to embodiments:
  the triplets of limit values (θ, φ, I/N) are determined by the following steps:
1) selecting, for each instant of a time interval, first terrestrial stations and a non-geostationary satellite linked with the second terrestrial station, and determining, for each instant of the time interval, a triplet of angle values defining a position of the first terrestrial stations selected relative to an axis formed by the second terrestrial station and the non-geostationary satellite and the signal-to-noise and interference ratio, the signal-to-noise and interference ratio being the signal-to-noise and interference ratio of the first stations selected with respect to the link between the second terrestrial station and the non-geostationary satellite;
2) determining the instants of the time interval and adjusting the signal-to-noise and interference ratio value of the triplet of these instants so that a distribution of the signal-to-noise and interference ratios aggregated over the time interval is greater than a reference distribution;
3) determining triplets of values (θ, φ, I/N) at the determined instants and a surface equation parameterized by the triplets (θ, φ, I/N), the triplets of values being the angles defining the position of the first terrestrial stations selected relative to the axis formed by the second terrestrial station and the non-geostationary satellite and I/N being an interference-to-noise ratio on the link between the second terrestrial station and the non-geostationary satellite determined by the adjusted signal-to-noise and interference ratios, the points of this surface equation representing the triplets of limit values (θ, φ, I/N).

The selection of the terrestrial stations and of the non-geostationary satellite in the step 1) is performed so as to minimize a signal-to-noise and interference ratio on a link between the second terrestrial station and the selected non-geostationary satellite.

The method comprises the following steps performed after the step 3):
4) for each instant of the time interval and for the second terrestrial station, selecting first terrestrial stations at points on the Earth and a non-geostationary satellite linked with the second terrestrial station, such that the first terrestrial stations have angle values and an interference-to-noise ratio on the link between the second terrestrial station and the non-geostationary satellite, and that, for these angle values, the interference-to-noise ratio is less than or equal to the interference-to-noise ratio obtained by the surface equation for these same angle values;

5) determining the instants of the time interval and adjusting the signal-to-noise and interference ratio value of the first terrestrial stations selected for these instants, so as to minimize the difference between a distribution of the signal-to-noise and interference ratios aggregated over the time interval of the first selected stations and a reference distribution, the distribution of the aggregate signal-to-noise and interference ratios being greater than the reference distribution;

6) determining a second surface equation parameterized by the angle and interference-to-noise ratio values adjusted on the basis of the adjusted signal-to-noise and interference ratios of the first terrestrial stations selected at the instants determined in the step 5), the points of this second surface equation representing the triplets of limit values ($\theta$, $\phi$, I/N).

The method comprises the following steps performed after the step 3):

3') determining the angle values defining the position of a first terrestrial station transmitting towards a non-geostationary satellite with the second terrestrial station and the interference-to-noise ratio of the first terrestrial station on the link between the second terrestrial station and the non-geostationary satellite;

3") comparing the interference-to-noise ratio to the interference-to-noise ratio determined by the surface equation for the angle values determined in 3'), so that:

if the interference-to-noise ratio is less than or equal to that determined by the surface equation, retaining or increasing the transmission power of the first terrestrial station so that its interference-to-noise ratio remains lower than that of the surface equation;

if the interference-to-noise ratio is greater than that obtained with the surface equation, reducing the transmission power of the first terrestrial station so that its interference-to-noise ratio is greater than or equal to that of the surface equation;

The method is implemented for a plurality of assumed positions of the second terrestrial station.

The first terrestrial stations and the non-geostationary satellite selected in the step 1) are those minimizing an angle value defining the position of the first terrestrial stations relative to an axis formed by the second terrestrial station and the selected non-geostationary satellite.

Another object of the invention is a computer program comprising instructions for executing the method for determining triplets of limit values ($\theta$, $\phi$, I/N) according to the invention, when the program is run by a processor.

Yet another object of the invention is a processor-readable storage medium, on which is stored a program comprising instructions for executing the method for determining triplets of limit values ($\theta$, $\phi$, I/N) according to the invention; when the program is run by a processor.

BRIEF DESCRIPTION OF THE DRAWINGS

Other features, details and advantages of the invention will emerge on reading the description given with reference to attached figures which are given by way of example and which represent, respectively.

DETAILED DESCRIPTION

Figure 1:
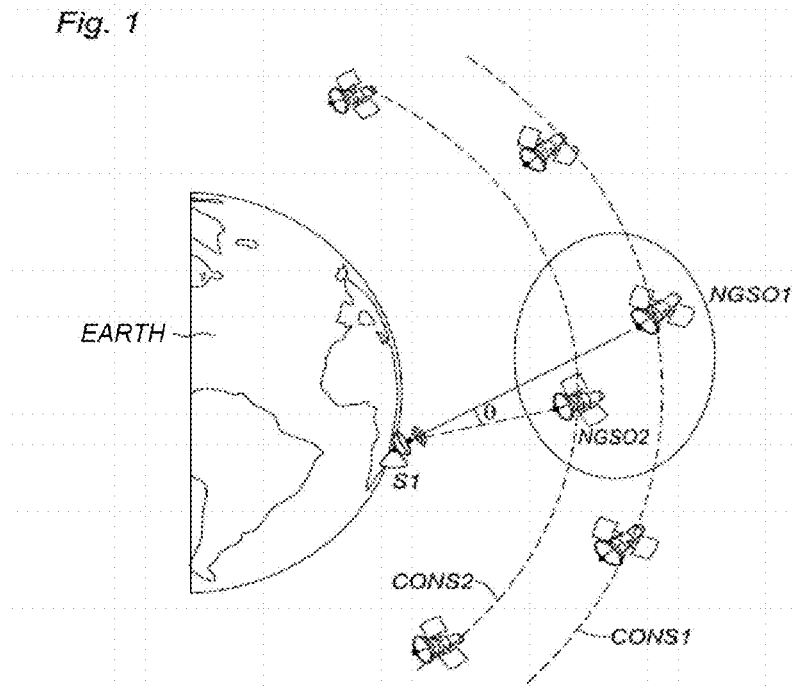
FIG. 1, already described, a diagram representing the current constraints of the constellations of non-geostationary satellites with respect to another non-geostationary system according to the prior art.
Figure 2A:
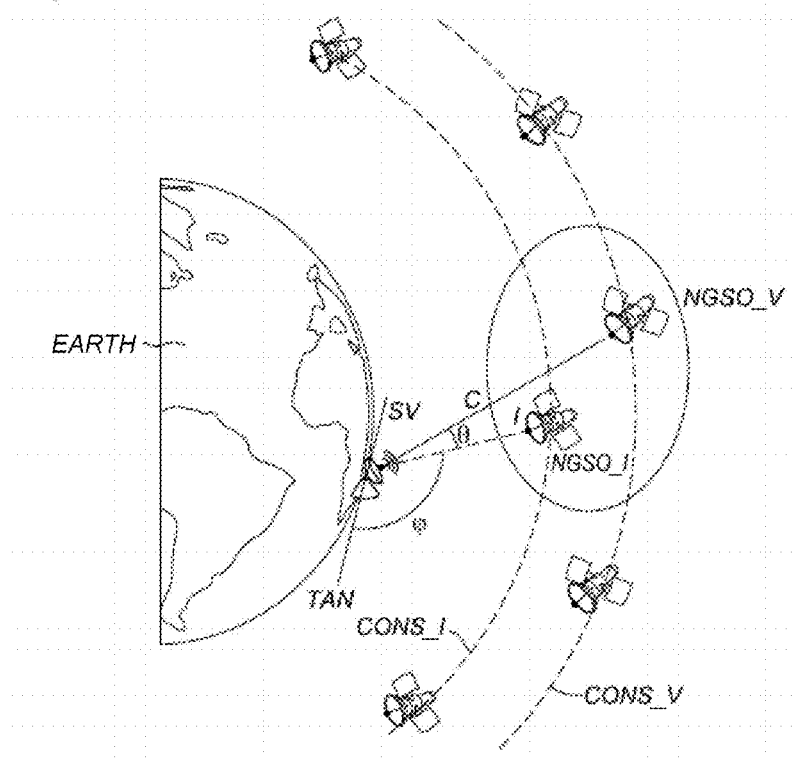
FIG. 2a and FIG. 2b, two diagrams of the principle of the method according to the invention for two application cases.

FIG. 2a represents a diagram of the principle of the method according to the invention in a first application case. This first application case represents a downlink. A constellation CONS_V, comprising several satellites situated on a non-geostationary orbit and comprising means capable of communicating with one or more terrestrial stations, comprises a non-geostationary satellite NGSO_V linked with a terrestrial station SV situated at a point on the Earth. The satellite NGSO_V therefore sends and/or receives signals C that are called useful to the terrestrial station SV.

Another constellation CONS_I comprises a non-geostationary satellite NGSO_I transmitting signals I to the terrestrial station SV. These signals can interfere with the link between the terrestrial station SV and the victim satellite NGSO_V and constitute a source of interference for this link. The constellation CONS_V and the satellite NGSO_V suffering these interferences are denoted victim constellation and victim satellite hereinafter in the description.

The topocentric angle $\theta$ is defined as the angle formed between the satellite NGSO_V and the satellite NGSO_I from the terrestrial station SV, and the elevation angle $\phi$ is defined as the angle formed between the plane TAN tangential to the ground at the terrestrial station SV and the axis formed by the terrestrial station SV and the satellite NGSO_I. These two angles $\theta$ and $\phi$ make it possible to define a position of the satellite NGSO_I relative to the satellite NGSO_V and to the station SV.

The objective of the method is to define the maximum power value of the interference signal I that the satellite NGSO_I can transmit to the station SV for a topocentric angle value $\theta$ and an elevation angle value $\phi$ that are fixed, by generating an acceptable level of interferences with respect to the constellation CONS_V. In other words, the objective of the method is to determine a maximum power for each satellite NGSO_I of the constellation CONS_I by taking account of the possible interferences generated with respect to the satellites NGSO_V of another constellation CONS_V situated in its vicinity. For that, triplets of limit values ($\theta$, $\phi$, R) of a topocentric angle $\theta$, of an elevation angle $\phi$ and of a signal-to-noise and interference ratio R are determined in such a way that a distribution of signal-to-noise and interference ratios R aggregated over a time interval is greater than a reference distribution REF.

The signal-to-noise and interference ratio R is the ratio between a useful signal C of the link between the terrestrial station SV and the satellite NGSO_V of the victim constellation CONS_V and the noise N and the interferences I transmitted by the interference constellation CONS_I on this link. In other words, the signal-to-noise and interference ratio R is equal to C/(N+I).

From the signal-to-noise and interference ratio R, it is possible to deduce the maximum transmission power of a satellite NGSO_I of the interfering constellation CONS_I from the determined triplets of values and using theoretical relationships known from the field. More particularly, it is possible to determine, for a given topocentric angle value $\theta$ and a given elevation angle value $\phi$, the maximum transmission power from the signal-to-noise and interference ratio of the triplet of values comprising the given angle values.

Figure 2B:
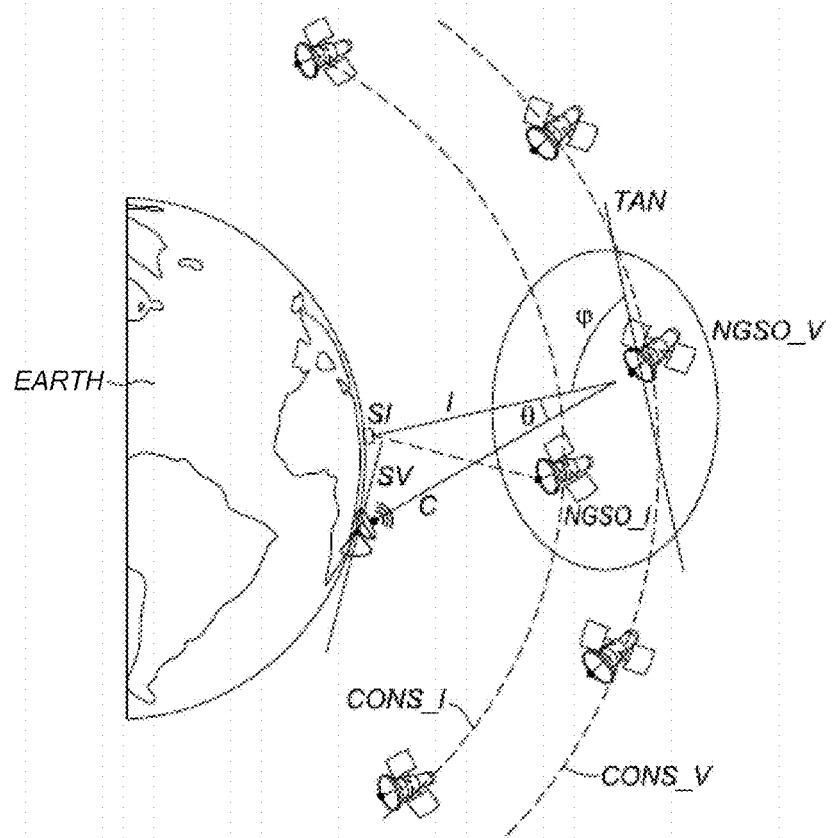

FIG. 2b represents a diagram of the principle of the method according to the invention in a second application case, representing an uplink. A constellation CONS_V, comprising several satellites situated on a non-geostationary orbit and comprising means capable of communicating with one or more terrestrial stations, comprises a non-geostationary satellite NGSO_V linked with a terrestrial station SV situated at a point on the Earth. The satellite NGSO_V therefore sends and/or receives signals C that are called useful to the terrestrial station SV.

Another terrestrial station SI, called interfering station, is linked with a second constellation CONS_I of non-geostationary satellites, notably with a non-geostationary satellite NGSO_I. This other terrestrial station SI also transmits signals I to the satellite NGSO_V linked with the terrestrial station SV. These signals I can interfere with the link between the terrestrial station SV and the satellite NGSO_V, called victim, and constitute a source of interference for this link.

In order to identify the position of the interfering terrestrial station SI, an angle $\theta$ formed between the station SV and the interfering station SI is defined from the victim non-geostationary satellite NGSO_V, and an angle of elevation $\phi$ is defined as the angle formed between the plane TAN tangential to the orbit of the victim constellation CONS_V and to the satellite NGSO_V and the axis formed by the interfering terrestrial station SI and the satellite NGSO_V. These two angles $\theta$ and $\phi$ make it possible to define the position of the station SI relative to the satellite NGSO_V and to the station SV.

The objective of the method, for this second application case, is to define the maximum power value of the interfering signal I that the station SI can transmit to the satellite NGSO_V for an angle value $\theta$ and an angle value $\phi$ that are fixed, by generating an acceptable level of interference with respect to the constellation CONS_V. In other words, the objective of the method is to determine a maximum power for each terrestrial station SI by taking account of the possible interferences generated with respect to satellite NGSO_V of a constellation CONS_V linked with a terrestrial station SV situated in its vicinity. For that, triplets of limit values ($\theta$, $\phi$, R) of the angles $\theta$, $\phi$ and of a signal-to-noise and interference ratio R are determined so that a distribution of signal-to-noise and interference ratios R aggregated over a time interval is greater than a reference distribution REF.

The signal-to-noise and interference ratio R is the ratio between a useful signal C of the link between the terrestrial station SV and the satellite NGSO_V of the victim constellation CONS_V and the noise N and the interferences I transmitted by the interfering station SI on this link. In other words, the signal-to-noise and interference ratio R is equal to C/(N+I).

From the signal-to-noise and interference ratio R, it is possible to deduce the maximum transmission power of the station SI from the triplets of values determined and using theoretical relationships known in the field. More particularly, it is possible to determine, for given angle values $\theta$ and $\phi$, the maximum transmission power from the signal-to-noise and interference ratio of the triplet of values comprising the given angle values.

Figure 3:
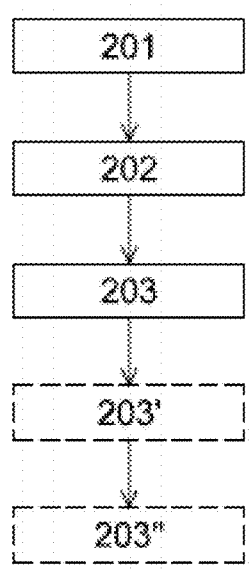
FIG. 3, a diagram of the steps of the method according to a first embodiment.

FIG. 3 presents a diagram of the steps of the method according to a first embodiment. The first application case (FIG. 2a) is taken for the description of FIGS. 3 to 7.

In a first step 201, for each instant of a time interval and for a terrestrial station SV at a point on the Earth, satellites of the interfering constellation CONS_I and a satellite NGSO_V of the victim constellation CONS_V are selected according to a selection criterion. In the example described, the satellites of the interfering constellation CONS_I and a satellite NGSO_V are selected which minimize the signal-to-noise and interference ratio R on the link between the terrestrial station SV and the satellite of the victim constellation CONS_V. However, it is also possible to select the satellite NGSO_V of the victim constellation that has the highest elevation in this constellation with respect to the terrestrial station SV. It is also possible to select an interfering satellite CONS_I that has the longest time of visibility with respect to the terrestrial station SV and/or a particular satellite of the victim constellation CONS_V.

Then, for these same instants, a triplet of values ($\theta$, $\phi$, R) of topocentric angle $\theta$, of elevation angle $\phi$ and of signal-to-noise and interference ratio R is determined for these selected satellites relative to the terrestrial station SV. The topocentric angle $\theta$ is the minimum angle formed by the satellite NGSO_V of the victim constellation CONS_V selected, the terrestrial station SV and the selected satellites NGSO_I of the interfering constellation CONS_I. The elevation angle $\phi$ is the minimum angle formed between the plane TAN tangential to the ground at the terrestrial station SV and the axis formed between the terrestrial station SV and the selected satellites NGSO_I of the interfering constellation CONS_I. The signal-to-noise and interference ratio R is the signal-to-noise and interference ratio of the interfering satellites NGSO_I of the interfering constellation CONS_I on the link between the terrestrial station SV and the victim satellite NGSO_V of the victim constellation CONS_V. This ratio R is determined by simulation.

Then, in a second step 202, a determination is made as to the instants of the time interval for which it is possible to adjust the signal-to-noise and interference ratio value R of the triplet of values ($\theta$, $\phi$, R) of these instants so that a distribution of the signal-to-noise and interference ratios R aggregated over the time interval is greater than the reference distribution REF.

Figure 5:
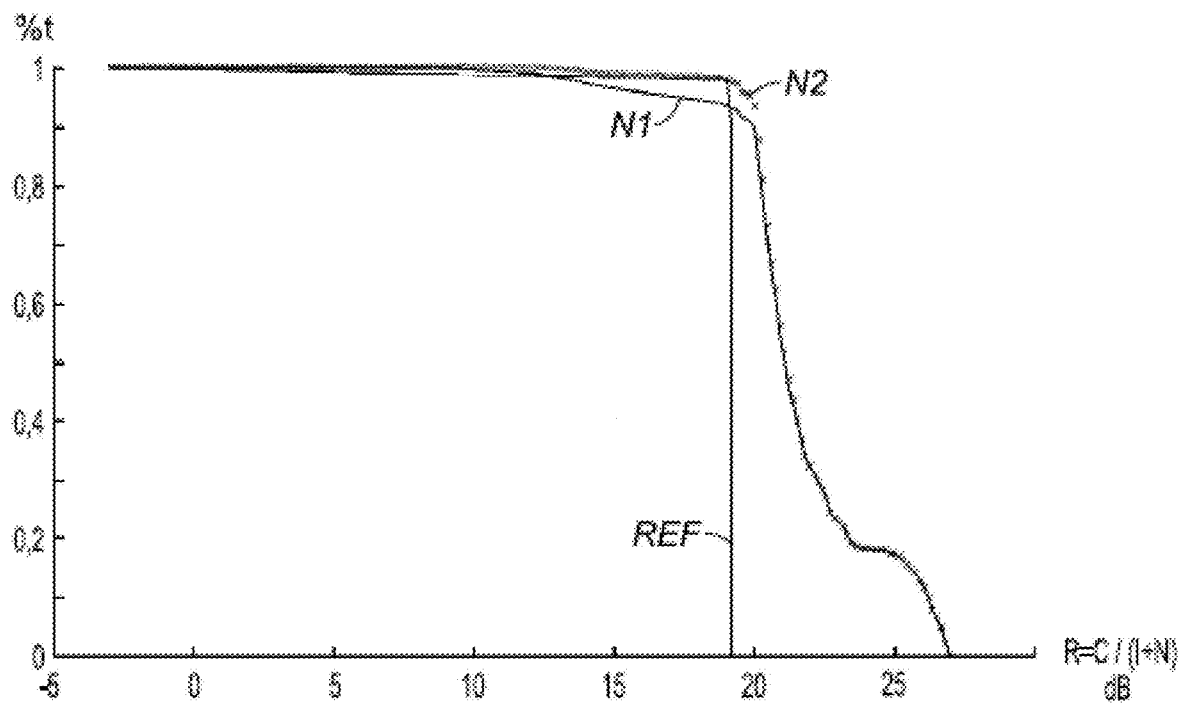
FIG. 5 and FIG. 6, two figures representing the principle of the step 2) of the method according to the invention.
Figure 6:
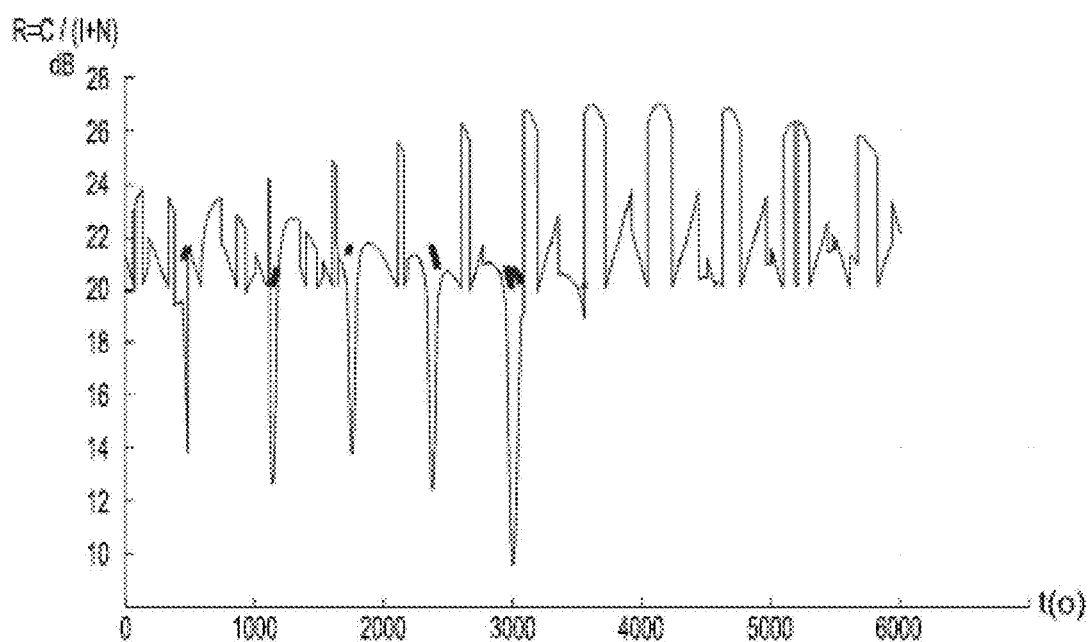

FIG. 5 and FIG. 6 illustrate the step 202 of the method.

FIG. 5 represents the percentage of time % t of the time interval as a function of the signal-to-noise and interference ratio R=C/(N+I). The curve REF represents the reference distribution and the curve N1 represents aggregate signal-to-noise and interference ratios of the satellites of the victim and interfering constellations selected with respect to the terrestrial station, whereas the curve N2 represents the same signal-to-noise and interference ratios after the identification of the time instants for which the value of the signal-to-noise and interference ratio is adjusted for the curve N1 to be greater than the reference distribution REF.

FIG. 6 represents the signal-to-noise and interference ratio R as a function of the different instants t of the time interval. It is these signal-to-noise and interference ratios aggregated over the time interval (therefore aggregated over all the instants t) which make it possible to obtain the curve N1 of FIG. 5. The identified time instants INST are represented in FIG. 6 and their signal-to-noise and interference ratio value R is modified so as to obtain the curve N2 of FIG. 5.

To determine these instants t of the time interval from FIGS. 5 and 6, it is assumed that the curve N1 of FIG. 5 follows a probability law as follows:

$$P_{N1}(X \geq x_n) = p_n \quad (1)$$

in which X represents a random variable of the signal-to-noise and interference ratio R, $x_n$ represents a particular value of a signal-to-noise and interference ratio, $p_n$ represents the time probability corresponding to the signal-to-noise and interference ratio value $x_n$ and n is an integer less than or equal to the total number of time instants of the time interval.

It is also assumed that the reference distribution REF follows the following probability law:

$$P_{REF}(X \geq x) = p \quad (2)$$

with p a time probability corresponding to the signal-to-noise and interference ratio value x and X being a random variable representing a signal-to-noise and interference ratio.

If the curve N1 becomes less than the reference distribution REF for all probabilities p, then that means that there is an integer i and m such that:

$$P_{N1}(X \geq x_i) = p_i \text{ and } P_{REF}(X \geq x_m) = p_i \text{ with } x_i < x_m \quad (3)$$

and such that:

$$P_{N1}(X \geq x_m) = p_m \text{ with } p_m < p_i \quad (4)$$

A law of the curve N1 is then sought to be obtained such that:

$$P_{N1}(X \geq x_i) = p_m \quad (5)$$

The first step is to identify the greatest value of i that does not observe the criterion of the equation (5), which means that, for $X = x_{i+1}$, the criterion will be observed. The value $x_i$ is then modified to become equal to $x_{i+1}$, that is to say that the signal-to-noise ratio value $x_i$ becomes equal to That is applied for all the other values of i that do not observe the criterion of the equation (5) by working through the i values in descending order.

That makes it possible to identify the values $x_i$ of signal-to-noise and interference ratios to be modified. It is now necessary to identify the time instants t corresponding to these values $x_i$. For that, in FIG. 6, it is possible to identify all the signal-to-noise and interference ratios that are equal to the identified values $x_i$, then modify signal-to-noise and interference ratio values of these instants so that the distribution of the signal-to-noise and interference ratios R, comprising the modified values, aggregated over the time interval, is greater than the reference distribution REF.

In the third step 203, triplets of values (θ, φ, I/N) are determined at the instants determined in the preceding step. The triplets of values (θ, φ, I/N) represent the angles (θ, φ) defining the position of a selected satellite NGSO_I of the first constellation CONS_I and I/N being an interference-to-noise ratio on the link determined by the signal-to-noise and interference ratios R adjusted in the preceding step for the determined instants.

In this step, a surface equation parameterized by the triplets of values (θ, φ, I/N) is also determined. The points of the surface equation represent the triplets of limit values (θ, φ, I/N) authorized for the satellites of the interfering constellation CONS_I with respect to the link between the terrestrial station SV and the victim satellite NGSO_V.

In an optional fourth step 203' and an optional fifth step 203", there will be a check as to whether a satellite of the interfering constellation CONS_I transmitting towards the terrestrial station SV transmits an interference level that is sufficiently low to preserve the link between the terrestrial station and a non-geostationary satellite of the victim constellation CONS_V.

For that, in the fourth step 203', the topocentric angle θ, elevation angle φ and interference-to-noise ratio I/N values are determined for the satellite of the interfering constellation CONS_I transmitting to the terrestrial station SV linked with the satellite of the victim constellation CONS_V.

Then, in the next step 203", the interference-to-noise ratio I/N is compared to the interference-to-noise ratio determined by the surface equation of the step 203 for the angle values θ and φ determined previously in 203'.

If the interference-to-noise ratio is less than or equal to the ratio determined by the surface equation, that means that the interfering satellite interferes little on the link between the terrestrial station and the satellite of the victim constellation. It is not therefore necessary to reduce the transmission power of the interfering satellite. It may even be possible to increase the transmission power of the interfering satellite, provided that the signal-to-noise and interference ratio value remains less than the ratio determined by the surface equation.

If the signal-to-noise and interference ratio is greater than the ratio determined by the surface equation, that means that the interfering satellite interferes with the link between the terrestrial station and the satellite of the victim constellation. It is therefore necessary to reduce the transmission power of the interfering satellite so that its signal-to-noise and interference ratio is greater than or equal to that determined by the surface equation. Instead of reducing the transmission power of the interfering satellite, it is also possible to use another satellite of the interfering constellation CONS_I to lower the level of interference.

Figure 7:
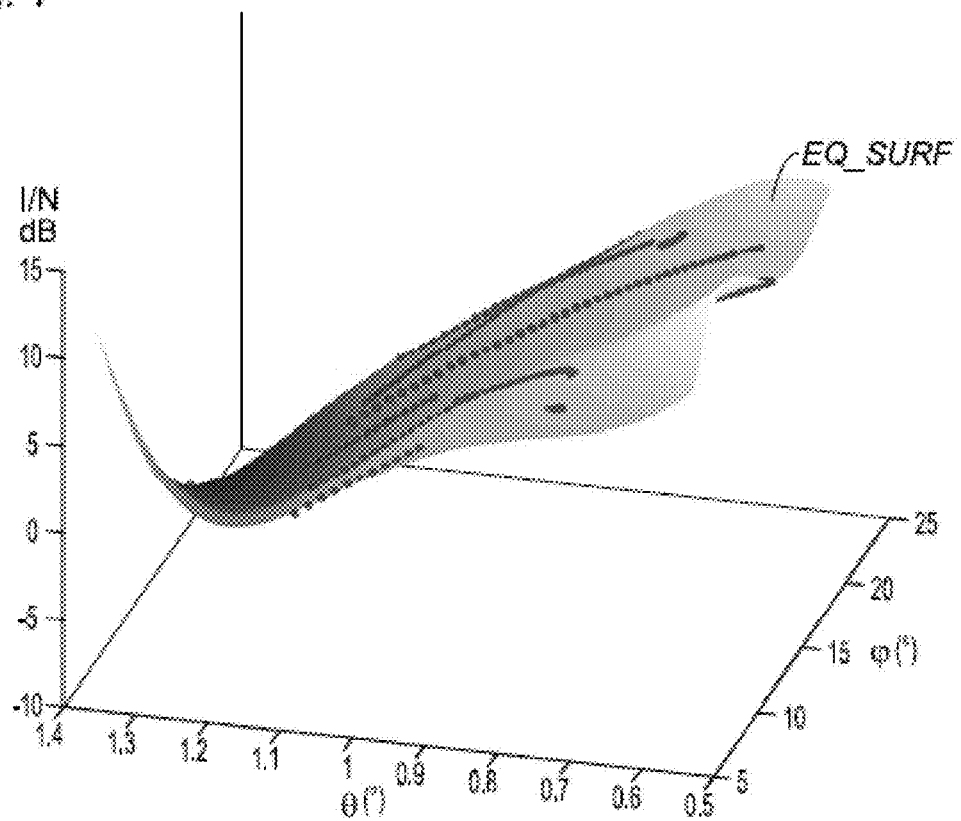
FIG. 7, a figure representing a surface equation obtained by the method according to the invention.

FIG. 7 represents a surface equation determined in the third step 203 of the method. The surface equation EQ_SURF depends on the two angles θ and φ defining the position of a satellite of the interfering constellation relative to the link between the terrestrial station SV and a satellite of the victim constellation and on the signal-to-noise and interference ratio R defined by the ratio between the useful signal of the link between the terrestrial station and the satellite of the victim constellation and the sum of the noise and of the interferences on this link coming from the satellite of the interfering constellation. The angle θ can be a topocentric angle formed between a satellite of the interfering constellation, the terrestrial station and a satellite of the victim constellation, and the angle φ can be an elevation angle formed between the plane tangential to the terrestrial station and the axis formed between the terrestrial station and the satellite of the interfering constellation.

The points of this surface equation EQ_SURF defined by a triplet of values (θ, φ, I/N) represent, for given angle values θ and φ, the maximum interference-to-noise ratio I/N and therefore the maximum level of interference that the satellite of the interfering constellation can have on the link.

Figure 4:
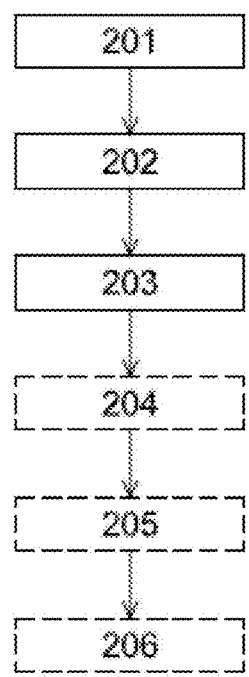
FIG. 4, a diagram of the steps of the method according to a second embodiment.

FIG. 4 represents a diagram of the steps of the method according to a second embodiment. The first 201, second 202 and third 203 steps are identical to the steps 201, 202 and 203 described with reference to FIG. 3.

In this second embodiment, three additional steps 204, 205 and 206 are performed to adjust the surface equation determined in the third step 203 to an operational situation.

There are therefore selected, in the fourth step 204, for each instant of the time interval and for a satellite of the victim constellation linked with the terrestrial station, the satellites of the interfering constellation which have topocentric angle θ, elevation angle φ and interference-to-noise ratio I/N values such that, for these angle values θ and φ, the interference-to-noise ratio I/N is less than or equal to the interference-to-noise ratio determined by the surface equation of the step 203 for these same angle values θ and φ.

Then, in the fifth step 205, a determination is made as to instants of the time interval for which it is possible to adjust the signal-to-noise and interference ratio value so that the distribution of the signal-to-noise and interference ratios aggregated over the time interval of the selected satellites of the interfering constellation with respect to the link between the terrestrial station and the satellite of the victim constellation is greater than the reference distribution.

Finally, in the sixth step 206, a second surface equation is determined that is parameterized by the angle θ and φ values and interference-to-noise ratios I/N adjusted from the signal-to-noise and interference ratios, adjusted in the step 205, of the selected satellites at the instants determined in the preceding step. The points of this second surface equation represent the triplets of corrected limit values (θ, φ, I/N). This second surface equation makes it possible to protect the two non-geostationary systems (that comprising the interfering constellation and that comprising the victim constellation and the terrestrial station) while relaxing the constraints defined by the first surface equation and corresponding to the worst interfering configuration between the two constellations, while operationally, the satellites of the two constellations can be in a more favourable configuration.

According to another embodiment, the method is performed for a plurality of terrestrial station assumptions. For that, if the method is performed for N terrestrial stations linked with a satellite of the victim constellation CONS_V, the steps 201, 202 and 203 (and possibly the steps 203', 203", 204, 205 and 206) are repeated N times, each repetition being performed for a station that is different from the previous repetitions. It will therefore be necessary on each repetition of the step 1) to redefine the satellites of the interfering constellation CONS_I and the satellite of the victim constellation CONS_V for each instant which minimize the signal-to-noise and interference ratio on the link.

According to one embodiment, the selection of the satellites of the two constellations with respect to the terrestrial station is made in such a way as to select the worst case, for example by taking the satellite, from among those minimizing the signal-to-noise and interference ratio, that gives the smallest topocentric angle θ.

According to another embodiment, it is also possible to determine triplets of limit values (θ, φ, R) in which R represents the signal-to-noise and interference ratio of the satellites of the interfering constellation on the link between the terrestrial station and a satellite of the victim constellation. Thus, it is also possible to determine a third surface equation from these triplets of values (θ, φ, R).

For that, the triplets of values (θ, φ, R) deriving from the instants determined in the step 202 are used to parameterize a third surface equation.

However, if the surface equation parameterized by the triplets (θ, φ, R) is used, the interfering satellites exhibiting ratio R values greater than those given by the third surface equation for given angle values will be sought to be selected.

For example, for the step 204, the satellites of the interfering constellation are selected such that, for a given topocentric angle value θ and for an elevation angle value φ, the signal-to-noise and interference ratio R is greater than the ratio R determined by the third surface equation for these same angle values.

According to another example, for the step 203", the signal-to-noise and interference ratios R are compared with the ratios determined by the third surface equation for topocentric and elevation angle values determined in the step 203', and the transmission power of the satellites of the interfering constellation is reduced if the ratio R is less than that determined by the third surface equation.

Nevertheless, the use of the ratio I/N is prioritized, because the ratio I/N is independent of the radio frequency characteristics specific to the link between the terrestrial station and the satellite of the victim constellation.

The figures have been described for the first application case. It is also possible to apply the method for the second application case, namely for an uplink, in which it is a terrestrial station SI which emits interfering signals I to the link between the terrestrial station SV and a satellite of the victim constellation. That corresponds to the situation presented in FIG. 2b.

In this application case, in the step 201, for each instant of a time interval, first terrestrial stations SI at points on the earth, different from the point of the terrestrial station SV, and a non-geostationary satellite of a non-geostationary constellation linked with the terrestrial station SV, which minimize a signal-to-noise and interference ratio R on the link between the terrestrial station SV and the selected non-geostationary satellite, are selected. There are also determined, for each instant of the time interval, a triplet (θ, φ, R) of angle values (θ, φ) defining a position of the first terrestrial stations SI selected relative to an axis formed by the terrestrial station SV and the non-geostationary satellite and signal-to-noise and interference ratio R. The ratios R being the signal-to-noise and interference ratios of the first stations selected with respect to the link between the terrestrial station and the non-geostationary satellite.

In the second step 202, the instants of the time interval are determined and, for these instants, the signal-to-noise and interference ratio value of the triplet (θ, φ, R) of these instants is adjusted so that a distribution of the signal-to-noise and interference ratios aggregated over the time interval is greater than a reference distribution (REF).

Then, in the step 203, triplets of values (θ, φ, I/N) at the determined instants and a surface equation parameterized by the triplets (θ, φ, I/N) are determined. The triplets of values (θ, φ, I/N) are the angles (θ, φ) defining the position of the first terrestrial stations selected relative to the axis formed by the second terrestrial station SV and the non-geostationary satellite NGSO_V and the interference-to-noise ratio I/N on the link between the terrestrial station SV and the non-geostationary satellite determined by the adjusted signal-to-noise and interference ratios (R). The points of this surface equation represent the triplets of limit values (θ, φ, I/N).

In the case where the aim is to adapt to an operational situation, the steps described with reference to FIG. 4 are as follows for this application case:

In the step 204, for each instant of the time interval and for the second terrestrial station SV, first terrestrial stations at points on the Earth and a non-geostationary satellite linked with the terrestrial station SV are selected, such that the first terrestrial stations have angle values (θ, φ) and an interference-to-noise ratio (I/N) on the link between the terrestrial station SV and the non-geostationary satellite of the victim constellation, and that, for these angle values, the interference-to-noise ratio is less than or equal to the interference-to-noise ratio obtained by the surface equation for these same angle values.

Then, in the step 205, the instants of the time interval are determined and signal-to-noise and interference ratio value (R) of the first selected terrestrial station for these instants are adjusted, so as to minimize the difference between a distribution of the signal-to-noise and interference ratios aggregated over the time interval of the first selected stations and a reference distribution (REF), the distribution of the aggregate signal-to-noise and interference ratios being greater than reference distribution.

Finally, in the step 206, a second surface equation is determined that is parameterized by the angle and interference-to-noise ratio values adjusted from the adjusted signal-to-noise and interference ratios of the first terrestrial stations selected at the instants determined in the step 205. The points of this second surface equation represent the triplets of limit values ($\theta$, $\phi$, I/N).

For the case of FIG. 3, in the step 203', the angle values ($\theta$, $\phi$) defining the position of a first terrestrial station transmitting toward a non-geostationary satellite linked with the terrestrial station SV and the interference-to-noise ratio (I/N) of the first terrestrial station on the link between the terrestrial station and the non-geostationary satellite are determined.

Then, in the step 203", the interference-to-noise ratio is compared to the interference-to-noise ratio determined by the surface equation for the angle values determined in the step 203', so as to:

if the interference-to-noise ratio is less than or equal to that determined by the surface equation, retain or increase the transmission power of the first terrestrial station so that its interference-to-noise ratio remains less than that of the surface equation;

if the interference-to-noise ratio is greater than that obtained with the surface equation, reduce the transmission power of the first terrestrial station so that its interference-to-noise ratio is greater than or equal to that of the surface equation.

As for the first application case, the method can be implemented for a plurality of assumed positions of the terrestrial station SV.

Likewise, the first terrestrial stations and the non-geostationary satellite selected in the step 201 can be those that minimize an angle value, for example $\theta$, defining the position of the first terrestrial stations relative to an axis formed by the second terrestrial station and the selected non-geostationary satellite.

The method according to the invention has been described in the context of two non-geostationary constellations. However, the method is not limited to that, it can also be used in a more general context involving a non-geostationary constellation and a geostationary constellation. That can for example be in the case where a geostationary constellation (satellite of the constellation or terrestrial station linked with the geostationary constellation) transmits interfering signals on a link between a terrestrial station on the Earth and a non-geostationary constellation. That can also be in the case where a non-geostationary constellation (satellite of the constellation or terrestrial station linked with the non-geostationary constellation) transmits interfering signals on a link with a terrestrial station on the Earth and a geostationary constellation.

The invention can be implemented as a computer program comprising instructions for the execution thereof. The computer program can be stored on a processor-readable storage medium. The medium can be electronic, magnetic, optical or electromagnetic.

In particular, the invention can be implemented by a device comprising a processor and a memory. The processor can be a generic processor, a specific processor, an application-specific integrated circuit (known also by the acronym ASIC) or a field-programmable gate array (also known by the acronym FPGA).

The device can use one or more dedicated electronic circuits or a general-purpose circuit. The technique of the invention can be produced on a reprogrammable computation machine (a processor or a microcontroller for example) executing a program comprising a sequence of instructions, or on a dedicated computation machine (for example a set of logic gates like an FPGA or an ASIC, or any other hardware module).

According to one embodiment, the device comprises at least one computer-readable storage medium (RAM, ROM, EEPROM, flash memory or another memory technology, CD-ROM, DVD or another optical disk medium, magnetic cassette, magnetic tape, computer-readable permanent storage disk) coded with a computer program (that is to say several executable instructions) which, when it is run on a processor or several processors, performs the functions of the embodiments of the invention described previously.

As an example of hardware architecture suitable for implementing the invention, a device according to the invention can comprise a communication bus to which there are linked a central processing unit or microprocessor (CPU), a read-only memory (ROM) that can comprise the programs necessary to the implementation of the invention; a random-access memory or cache memory (RAM) comprising registers suitable for storing variables and parameters created and modified during the execution of the abovementioned programs; and a communication or I/O (input/output) interface suitable for transmitting and receiving data.

The reference to a computer program which, when it is run, performs any one of the functions described previously, is not limited to an application program running on a single host computer. On the contrary, the terms computer program and software are used here in a general sense to refer to any type of computing code (for example, application software, firmware, microcode, or any other form of computer instruction) which can be used to program one or more processors to implement aspects of the techniques described here. The computing means or resources can notably be distributed ("cloud computing"), possibly with according to pair-to-pair technologies. The software code can be executed on any appropriate processor (for example, a microprocessor) or processor core or a set of processors, whether provided in a single computation device or distributed between several computation devices (for example as possibly accessible in the environment of the device). The executable code of each program allowing the programmable device to implement the processes according to the invention can be stored, for example, in the hard disk or in read-only memory. Generally, the program or programs will be able to be loaded into one of the storage means of the device before being executed. The central processing unit can control and direct the execution of the instructions or portions of software code of the program or programs according to the invention, instructions which are stored in the hard disk or in the read-only memory or else in the other abovementioned storage elements.

The invention claimed is:

1. A method, implemented by computer, for determining operational constraints to be observed for a first terrestrial station (SI) at a point on the Earth, transmitting towards a non-geostationary satellite (NGSO_V) of a constellation of non-geostationary satellites (CONS_V) linked with a second terrestrial station (SV) with respect to the link between the satellite (NGSO_V) and the second terrestrial station (SV), the operational constraints comprising at least a maximum transmission power of the first terrestrial station (SI), the method comprising the steps of:

determining triplets of limit values (θ, φ, I/N) of two angles (θ, φ) and of an interference-to-noise ratio, the two angles (θ, φ) defining a position of the first terrestrial station (SI) relative to an axis formed by the second terrestrial station (SV) and the non-geostationary satellite (NGSO_V) and the interference-to-noise ratio (I/N) being the ratio between the interferences (I) transmitted by the first terrestrial station on the link between the second terrestrial station (SV) and the non-geostationary satellite (NGSO_V) and the noise (N) of the link, the determination of the triplets being performed in such a way that a distribution of signal-to-noise and interference ratios (R) aggregated over a time interval is greater than a reference distribution (REF), the signal-to-noise and interference ratios (R) being the ratios between a useful signal (C) of the link and the noise (N) and the interferences (I);

determining at least the maximum transmission power of the first terrestrial station (SI) from the triplets of values.

2. The method, implemented by computer, for determining operational constraints according to claim 1, wherein the triplets of limit values (θ, φ, I/N) are determined by the following steps:

1) Selecting, for each instant of a time interval, first terrestrial stations (SI) and a non-geostationary satellite (NGSO_V) linked with the second terrestrial station (SV) and determining, for each instant of the time interval, a triplet (θ, φ, R) of angle values (θ, φ) defining a position of the first terrestrial stations (SI) selected with respect to an axis formed by the second terrestrial station (SV) and the non-geostationary satellite (NGSO_V) and of signal-to-noise and interference ratio (R), the signal-to-noise and interference ratio being the signal-to-noise and interference ratio of the selected first stations with respect to the link between the second terrestrial station and the non-geostationary satellite;

2) determining the instants of the time interval and adjusting the signal-to-noise and interference ratio value of the triplet (θ, φ, R) of these instants in such a way that a distribution of the signal-to-noise and interference ratios aggregated over the time interval is greater than a reference distribution (REF);

3) determining triplets of values (θ, φ, I/N) at the determined instants and a surface equation parameterized by the triplets (θ, φ, I/N), the triplets of values (θ, φ, I/N) being the angles (θ, φ) defining the position of the first terrestrial stations selected with respect to the axis formed by the second terrestrial station (SV) and the non-geostationary satellite (NGSO_V) and I/N being an interference-to-noise ratio on the link between the second terrestrial station and the non-geostationary satellite determined by the adjusted signal-to-noise and interference ratios (R), the points of this surface equation representing the triplets of limit values (θ, φ, I/N).

3. The method, implemented by computer, for determining operational constraints according to claim 2, wherein the selection of terrestrial stations and the non-geostationary satellite in the step 1) is carried out in such a way as to minimize a signal-to-noise and interference ratio (R) on a link between the second terrestrial station (SV) and the selected non-geostationary satellite.

4. The method, implemented by computer, for determining operational constraints according to claim 2, comprising the following steps performed after the step 3):

4) For each instant of the time interval and for the second terrestrial station (SV), selecting the first terrestrial stations at points on the Earth and a non-geostationary satellite linked with the second terrestrial station such that the first terrestrial stations have angle values (θ, φ) and an interference-to-noise ratio (I/N) on the link between the second terrestrial station (SV) and the non-geostationary satellite and such that, for these angle values, the interference-to-noise ratio is less than or equal to the interference-to-noise ratio obtained by the surface equation for these same angle values;

5) determining the instants of the time interval and adjusting the signal-to-noise and interference ratio value (R) of the selected first terrestrial stations for these instants so as to minimize the difference between a distribution of the signal-to-noise and interference ratios aggregated over the time interval of the selected first stations and a reference distribution (REF), the distribution of the aggregate signal-to-noise and interference ratios being greater than the reference distribution;

6) determining a second surface equation parameterized by the angle and interference-to-noise ratio values adjusted on the basis of the adjusted signal-to-noise and interference ratios of the first terrestrial stations selected at the instants determined in the step 5), the points of this second surface equation representing the triplets of limit values (θ, φ, I/N).

5. The method, implemented by computer, for determining operational constraints according to claim 2, wherein the method comprises the following steps performed after the step 3):

3') determining the angle values (θ, φ) defining the position of a first terrestrial station transmitting towards a non-geostationary satellite linked with the second terrestrial station and the interference-to-noise ratio (I/N) of the first terrestrial station on the link between the second terrestrial station and the non-geostationary satellite;

3") comparing the interference-to-noise ratio to the interference-to-noise ratio determined by the surface equation for the angle values determined in 3'), so that:

if the interference-to-noise ratio is less than or equal to that determined by the surface equation, retaining or increasing the transmission power of the first terrestrial station so that its interference-to-noise ratio remains lower than that of the surface equation;

if the interference-to-noise ratio is greater than that obtained with the surface equation, reducing the transmission power of the first terrestrial station so that its interference-to-noise ratio is greater than or equal to that of the surface equation.

6. The method, implemented by computer, for determining operational constraints according to claim 2, wherein the method is implemented for a plurality of assumed positions of the second terrestrial station (SV).

7. The method, implemented by computer, for determining operational constraints according to claim 2, wherein the first terrestrial stations and the non-geostationary satellite selected in the step 1) are those minimizing an angle value (θ) defining the position of the first terrestrial stations relative to an axis formed by the second terrestrial station and the non-geostationary satellite selected.

8. A computer program comprising instructions for executing the method for determining triplets of limit values (θ, φ, I/N) according to claim 1, when this program is run by a processor.

9. A non-transitory Processor-readable storage medium, on which is stored a program comprising instructions for executing the method for determining triplets of limit values (θ, φ, I/N) according to claim 1, when the program is run by a processor.

* * * * *